United States Patent [19]

McGregor, Sr. et al.

[11] 4,044,621

[45] Aug. 30, 1977

[54] SPROCKET STRUCTURE AND CHAIN GUARD

[76] Inventors: John C. McGregor, Sr., 252 N. Broadmoor Blvd., Springfield, Ohio 45504; Daniel P. McGregor, 1505 N. Lowry Ave., Springfield, Ohio 45506; James B. McGregor, 622 Snowhill Blvd., Springfield, Ohio 45504

[21] Appl. No.: 585,380

[22] Filed: June 9, 1975

[51] Int. Cl.² .......................................... F16H 55/30
[52] U.S. Cl. .................................. 74/243 R; 74/609; 74/611
[58] Field of Search ...................... 74/243 R, 609, 611

[56] References Cited

U.S. PATENT DOCUMENTS

| 740,445 | 10/1903 | Langerfeld | 74/243 R |
|---|---|---|---|
| 1,877,339 | 9/1932 | Kottlowski | 74/243 R |
| 1,988,421 | 1/1935 | McCann et al. | 74/243 R |
| 2,724,975 | 11/1955 | Drummond | 74/243 R X |
| 3,173,301 | 3/1965 | Miller | 74/243 R |
| 3,477,303 | 11/1969 | Brilando | 74/243 R |

FOREIGN PATENT DOCUMENTS

| 457,355 | 6/1949 | Canada | 74/243 R |
|---|---|---|---|
| 910,326 | 6/1946 | France | 74/243 R |
| 966,937 | 10/1950 | France | 74/243 R |
| 985,825 | 7/1951 | France | 74/243 R |
| 434,787 | 5/1948 | Italy | 74/243 R |
| 629,557 | 9/1949 | United Kingdom | 74/243 R |

Primary Examiner—Samuel Scott
Assistant Examiner—Randall Heald
Attorney, Agent, or Firm—Jerome P. Bloom

[57] ABSTRACT

Apparatus particularly advantageous for use as part of a bicycle or other chain drive assembly featuring a single plate formed to embody a plurality of drive sprockets. A preferred embodiment illustrated is comprised of a plate the central portion of which is dished and offset to a plane parallel to that occupied by an outer annular portion which embodies a set of sprocket teeth on its outer periphery. The offset plate portions are rigidly fixed in their respective positions by strip-like connectors which extend from the outer periphery of the dished portion of the plate to the inner periphery of said annular plate portion. The central dished portion of the plate is flat and has a disc-like configuration which also embodies sprocket teeth on its outer periphery, intermediate notched portions thereof from which extend the radial connector strips.

Also featured is a plate-like chain guard which has a dished configuration. The dished portion of the guard plate is designed to seat to the central disc-like portion of the sprocket plate. The seating plate portions are specifically configured to interlock by a mere rotary movement of one plate relative the other in the seating process.

17 Claims, 8 Drawing Figures

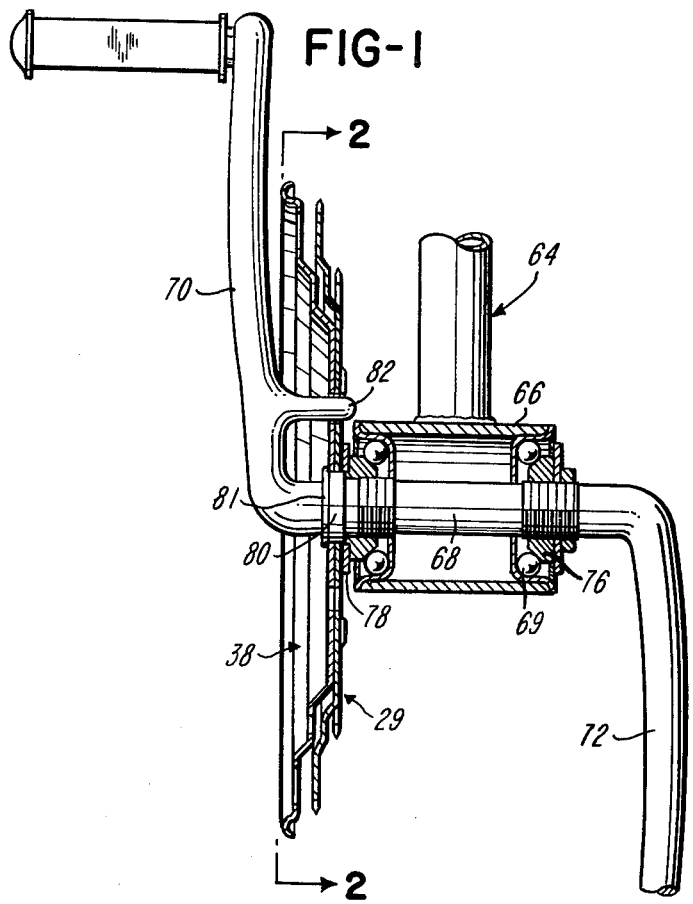
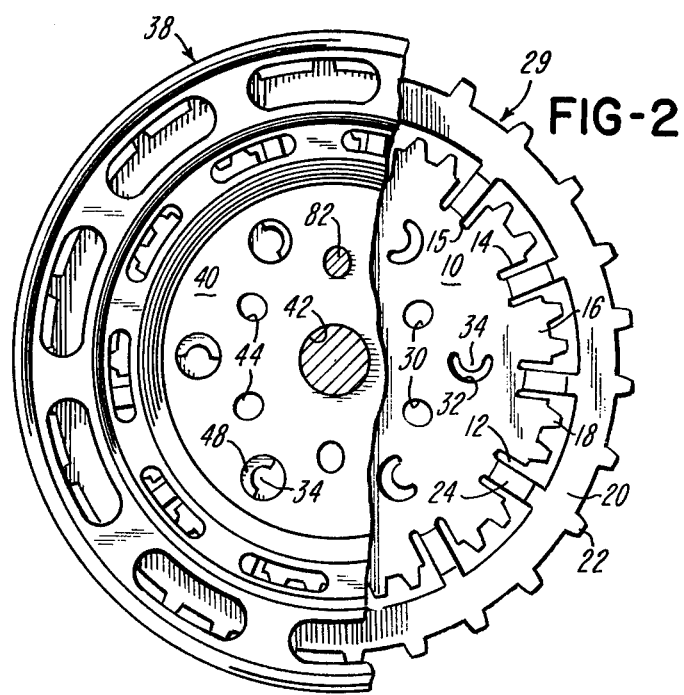

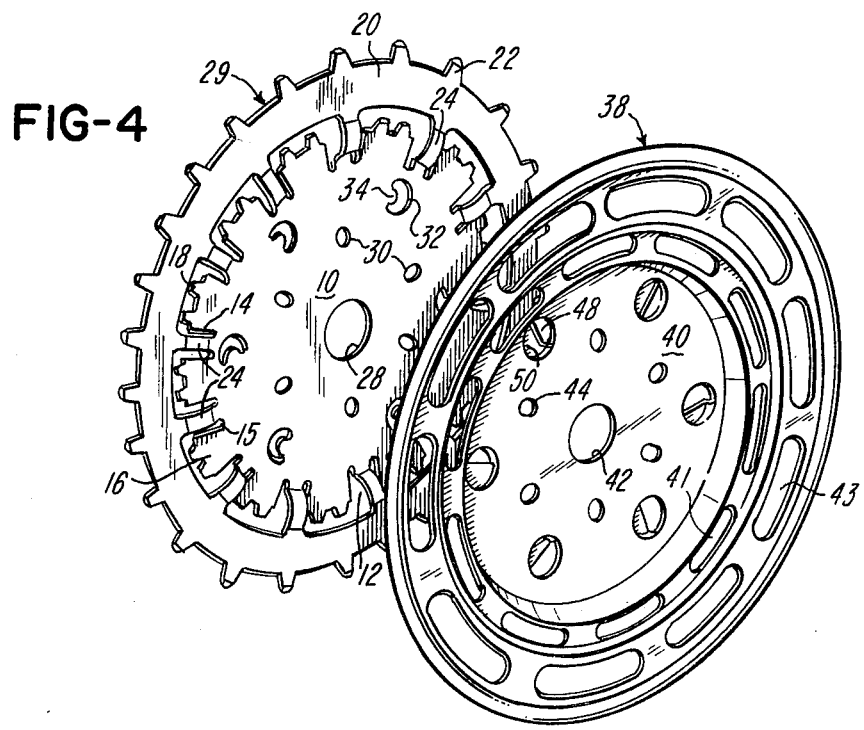

SPROCKET STRUCTURE AND CHAIN GUARD

BACKGROUND OF THE DISCLOSURE

This invention relates to improvements in means and metods for providing sprocket wheel assemblies which afford optional drive characteristics. The apparatus of the invention has a particularly advantageous application for use in bicycles and will be so described. It is to be understood, however, that the application of the invention is not so limited and such is not intended.

Most of the present day bicycles embody a plurality of gears in the form of sprockets and utilize a chain drive which may be selectively shifted from one drive sprocket to another to permit one to pedal at different speeds or with the same ease and at a selected speed whether moving over a flat surface or up or down an inclined surface.

In accordance with the prior art, the plurality of the drive sprockets embodied in a drive system for a bicycle are normally fabricated separately and then bolted or otherwise secured together in a side-by-side relation in the mounting thereof to form part of the pedal assembly of a bicycle. The construction and assembly of drive sprockets in this fashion has proven to be relatively costly procedure, in terms of both material and labor. In mounting the various drive sprockets of an assembly their sprocket teeth must be precisely formed, related and oriented to enable a smooth and certain shifting of a drive chain from one to another in their use. This means that not only must each sprocket be carefully machined but the drive sprockets of any assembly must be carefully oriented as they are assembled to a pedal structure and they must thereafter remain fixed in their established positions. Achieving these objectives with any great degree of certainty is extremely difficult since it requires that not only the sprockets but their fastening means must be designed with careful tolerances to insure that in the final assembly the sprockets are established in a proper parallel relation and with the precise spacing required for their effective use. Further problems are inherent in this prior art practice of providing sprocket assemblies in that the vibration and shock to which a bicycle is subjected during any normal usage will tend to loosen and consequently produce a misalignment of parts, resulting in wear on the parts. It will be obvious, of course, that where the parts become misaligned due to loosening of their fastening means that malfunction in the process of shifting gears in a bicycle can readily occur. The same may occur where there has been wear in use and even with maintenance to tighten the drive sprocket assembly there is an inherent altered alignment.

Additional complications have been produced in prior art sprocket assemblies in the conventional fastening in connection therewith of a chain guard. The chain guard itself is often subject to impact in handling of a bicycle, which impact can in turn affect the security of the fastening means by which it is incorporated in conjunction with the sprocket wheel assembly. The indirect result of such an impact can be a loosening of the parts of the sprocket wheel assembly or a misalignment thereof due to the fact that the rigidity of the assembly, being comprised of separable parts, is not such to offer optimal resistance to displacement of parts under such conditions.

It is to the solution of the noted problems of the prior art to which the present invention is directed.

SUMMARY OF THE INVENTION

The present invention provides a uniquely fabricated, utilized, plural sprocket structure formed as a single plate in a stamping or like procedure. The stamping procedure is preferred since it is the most economical and precise way of forming and lending the structure the necessary strength and rigidity required for its application. This preference does not, however, preclude the possibility of the structure being formed in a molding process.

In any event, in a single stamping effort applied to sheet metal the invention provides that a plate is formed, the respective inner and outer portions of which are off-set to occupy substantially parallel planes. In the course of a stamping, the outer peripheral edge of each of the offset portions is provided with a series of sprocket teeth to form thereby a plate embodying a plurality sprocket portions which are positioned in a relatively closely adjacent, spaced, parallel relation.

In the preferred embodiment of the sprocket structure illustrated, the plate is centrally dished in the forming process to produce therein a disc-shaped central portion the outer peripheral edge of which is formed with a series of circumferentially and uniformly spaced notches and between such notches with peripherally projected sprocket teeth. Simultaneous with this formation of a centrally offset disc-shaped sprocket, the outer peripheral portion of the plate is formed to have the configuration of a ring gear. In the stamping process the material between the ring gear and the disc-shaped central portion of the plate is removed with the exception of radial strips, the inner ends of which connect with the notched edge portions of the central disc and the outer ends of which are offset and connected with the inner peripheral edge of the ring gear. The disc-shaped sprocket portion of the plate is also provided with a central aperture and, in concentric relation thereto, a first series of six circularly spaced apertures and, outwardly therefrom and concentric therewith, a further series of circularly spaced apertures, which in this case have an arcuate form. The latter form tabs in the body of the plate formed sprocket structure adapted to have a rotary bayonet type interfit with a chain guard complementarily formed, in accordance with the invention, as a further plate element. The dished portion of the chain guard is provided with a series of apertures adapted to align with apertures in the sprocket plate structure to afford selective passage thereby for the driving stud portion of a bicycle pedal structure.

It will be seen that the sprocket and chain guard assembly as provided by the invention is an extremely rugged and simply interfit structure which obviates the need of special or interposed separating elements and fasteners.

A primary object of the invention is to provide a new and improved plural sprocket structure which is economical to fabricate, more efficient and satisfactory in use, adaptable to a wide variety of applications and unlikely to malfunction.

An additional object of the invention is to obviate the need for the use of separable fasteners in embodying a plurality of drive sprockets in a drive assembly.

Another object of the invention is to form a plurality of sprockets in an integrated structure wherein the sprockets have a fixed relation, one to the other.

A further object of the invention is to provide an improved assembly of a chain guard and a plurality of sprockets wherein the assembly can be effected by a simple rotary motion of one part relative the other.

An additional object of the invention is to provide a sprocket structure and a chain guard which are interrelated to lend the parts mutual support and rigidity.

Another object of the invention is to provide a new and improved chain guard having particularly advantageous application to use in conjunction with a sprocket assembly.

A further object of the invention is to provide an improved construction for mounting a guard plate to a device such as a gear or sprocket providing means which enable a firm engagement of one to the other without the need for conventional fasteners.

Another object of the invention is to provide an improved construction for a gear or sprocket and a related guard plate whereby the mount of one to the other may be achieved by means adapted to frictionally interlock as face portions thereof are abutted and one thereof is rotated relative the other.

With the above and other incidental objects in view as will more fully appear in the specification, the invention intended to be protected by Letters Patent consists of the features of construction, the parts and combinations thereof, and the mode of operation as hereinafter described or or illustrated in the accompanying drawings, or their equivalents.

Referring to the accompanying drawing wherein is shown one but obviously not necessarily the only form of embodiment of the invention, FIG. 1 is a view of a fragment of a bicycle illustrating the embodiment of a sprocket structure and chain guard assembly in accordance with the invention as mounted to the pedal apparatus of the bicycle;

FIG. 2 is a side view of the sprocket structure and chain guard assembly of the invention taken on line 2—2 of FIG. 1 with a portion of the chain guard being broken away to illustrate details of the sprocket structure;

FIG. 3 is an enlarged cross sectional view of the sprocket structure and chain guard in their assembled relation;

FIG. 4 is an exploded perspective view of the sprocket structure and chain guard of the invention;

FIGS. 5 and 6 are fragmentary views illustrating the means and method for integrating the sprocket structure and the chain guard by a simple rotary motion of one relative the other;

FIG. 7 is a view taken on line 7—7 of FIG. 5; and

FIG. 8 is a view taken on line 8—8 of FIG. 6.

Like parts are indicated by similar characters of reference throughout the several views.

Referring to the drawings, the sprocket structure of the invention in the preferred embodiment illustrated is formed as a one-piece plate structure made as by stamping from sheet metal.

The stamping operation produces a relative displacement of concentric inner and outer plate portions which are relatively displaced so as to lie in adjacent, spaced, parallel planes. The inner plate portion is thus dished to lie inwardly of the outer plate portion and formed as a flat disc 10 the outer peripheral edge of which includes a series of circumferentially and uniformly spaced notches 12, the lateral sides 14 of which are substantially parallel. This produces a peripheral edge on the disc 10 which embodies a plurality of circumferentially spaced, radially oriented, finger-like formations 16 bounded laterally, in each case, by notches 12. Formed on the uniformly arcuate outer edge of each of the finger formations 16, in the case illustrated, is a pair of circumferentially spaced radially projected sprocket teeth 18.

The outer plate portion is formed as a flat annulus 20 including, on its outer peripheral edge, a series of circumferentially and uniformly spaced, radially projected, sprocket teeth 22.

In the stamping process, the sheet metal material of the original work piece between the outer peripheral edge of the disc 10 and the inner peripheral edge of the annulus 20 is removed except for a plurality of circularly and uniformly spaced, radially oriented, narrow connector strips 24. The strips 24 are joined at their innermost ends, in each case, to the innermost or base portion 15 of a notch 12 in the disc 10, centered between its laterally bounding sides 14. The radial outermost ends of the strips 24 merge with and are joined to the inner peripheral edge of the annulus 20. As each connector strip 24 extends outwardly of the disc 10 it is gently curved out of the plane of the disc to dispose its radial outermost limit in the plane of the annulus 20. As so provided, the strips 24 form rigid connections between the disc 10 which provides a first and smaller sprocket 26 and the annulus 20 which provides, by the form thereof, a second and larger sprocket 29 integrated with the first in a unitized construction of the sprocket plate.

Attention is directed to the fact that the arrangement of the sprocket teeth about the disc 10 is discontinuous by reason of the interruption provided by the notches 12. Also, while two sprocket teeth are shown on each finger-like formation 16, this number may vary depending on the application. In any event, however, the teeth 18 form a circular set which is thoroughly adequate for drive purposes. It has been found, utilizing the invention concept, that, for example, 26 effective teeth in connection with the disc 10 will function equivalent to a 52 tooth conventional sprocket. The saving in fabrication so created is significant. Of course, the same principle can be applied to sprockets which would be designed with a lesser or greater amount of teeth.

Note further that in the particular embodiment illustrated, the teeth 22 are positioned to lie either in a direct radial line with a strip 24 or on a line centered between the radial center lines of a pair of teeth 18 on a finger-like formation 16.

The sprocket structure so provided in plate form has substantial strength and rigidity of a nature to strongly resist any displacement of the inner disc formed sprocket 26 from the outer annular sprocket 29 which has the form of a ring gear. The planes of the sprocket portions are thereby fixed and the teeth thereof are correspondingly fixed and maintained in a precisely required position of reference. The use of rigid strip-like connectors 24 and the arrangement and form described does in fact reinforce the plate structure and lends substantial resistance to what ordinarily would be the undesirable effects of impact and shock.

Included in the disc portion 10 of the plate type sprocket structure of the invention is a central aperture 28 and outwardly therefrom a group of concentric circularly spaced apertures 30. Spaced immediately outward and concentric with the apertures 30 is a further series of six circularly spaced apertures 32 which are arcuate or crescent-shaped in configuration. The crescent-shape of each of the aperture 32 produces at one side thereof a tongue-like formation 34 in the disc 10.

These tongues, as will be seen, serve as an interlocking means in connection with the application of a chain guard of the present invention to the utilized plate-like multiple sprocket formation just described.

As seen in the accompanying drawings, the chain guard 38 of the invention is a one-piece plate structure having a generally dished configuration. The central dished portion of the guard 38 has the form of a flat disc 40 the diameter of which is slightly less than the basic diameter of the disc portion 10. The disc portion 40 of the guard plate includes a central aperture 42 adapted to align with the central aperture 28 in the disc 10. It also embodies a series of six apertures 44 positioned and spaced so that in application of the chain guard to the sprocket structure they can be aligned with corresponding apertures 30. Additionally included in the disc 40, in concentric relation to and positioned radially outward from the apertures 44, are a series of circularly spaced outwardly offset plate portions 48. The plate portions 48 have a peripheral configuration defined by a chord subtending an arc of approximately 150° and are each arranged to overlie in part an additional aperture 50 formed in the plate portion 40. The offet portions 48 and apertures 50 are created in the stamping operation by producing in the disc portion 40 a series of depressions having a circular outline the radius of which corresponds substantially to that of the outer arcuate portion of the crescent shaped apertures 32. As these depressions are effected, about 60% of the material so offset, in each instance, is cut out, leaving in the plane of the disc portion 40, in each case, an aperture 50 rimmed at one side (approximately 150° of its circular extent) by an outwardly projected shallow wall in connection with a depressed plate segment 48 which is offset and in a plane adjacent and slightly inclined to that of the disc portion 40. Thus, the net effect of the construction so provided is that which occurs by displacing small disclike portions of the plate portion 40 and cutting out slightly more than half of the disc portions so displaced. In any event, in each case the offset plate portion 48 has the effect of a protuberance from the rear face of the plate portion 40 forming a shallow pocket which has a lateral opening. Due to the slight inclination of the plate portion 48 the base surface 49 of the pocket provides a wedging or camming surface the purpose of which will soon become obvious. In the example illustrated the guard plate thus embodies a series of six circularly and equidistantly spaced pockets which are open laterally in the same sense.

The guard plate 38 is so constructed to compactly nest in the dished surface of the sprocket plate. As seen in FIGS. 5 through 8, in assembly the base or rear surface of the disc portion 40 can be seated to the disc portion 10 so the protuberances formed by the off-set plate portions 48 can drop through the openings provided by the crescent shaped apertures 32. Once this is effected, a simple rotary movement of one of the sprocket plate and guard plate relative to the other will cause the tongue formations 34 to respectively slip into the entrance portions of correspondingly configured tongue accommodating pockets defined by the offset plate portions 48. Due to the nature of the displacement and slight inclination of the plate portions 48, and thereby the case surfaces 49, of the pockets, the depth of the pockets will gradually decrease in a sense inwardly of their entrance portions. This decrease is so that as a continued rotary movement of one of the sprocket plate and guard plate is suitably effected, an increasing pressured and wedged engagement is effected between the adjacent surfaces of the tongue formations 34 and the surfaces 49 of the plate portions 48. It would be obvious, therefore, that by reason of a simple and appropriate seating of the guard plate 38 to have its plate portion 40 suitably oriented in an abutting relation to the disc portion 10 and a rotary movement of one of the sprocket plate and the guard plate relative the other as described, a firm interlock is achieved, in the process of which the apertures 30 and the apertures 44 will be caused to align. Any one of the pairs of apertures 30 and 44 so aligned are thus provided to enable such pairs to selectively accommodate a driving stud in connection with the crank portion of the pedal assembly of a bicycle where the invention structure is so applied.

It is noted that the means described for mounting the guard plate 38 to the sprocket structure has general utility and the structural concept which is illustrated is equally and highly advantageous in application of a guard plate to any gear or other wheel-like member. A significant advantage in use of this particular concept is the avoidance of a need for use of conventional fasteners, thereby eliminating parts and costs as well as maintenance problems inherent in the use thereof.

It will be seen that outwardly of its dished portion 40 the plate 38 has a stepped and relatively offset peripheral rim the outer peripheral edge 39 of which is curled over to provide it with a smooth rounded outer peripheral surface adjacent the sprocket teeth 22, from which in assembly of the plate 38 it is closely spaced. Note that the stepped portion of the outer rim of the plate 38 adjacent and outwardly of the dished portion 40 includes a series of openings 41 through which a sprocket chain applied to the sprocket structure may be readily observed. Also the outermost stepped portion of the plate 38 includes apertures 43 enabling a visual inspection therethrough of the sprocket teeth. These features lend obvious benefits.

With the guard plate and sprocket structure connected as described they are in a precise relationship required for a simple and most effective use. Not only are the sprockets rigidly and effectively positioned by reason of their unitized relation but the chain guard is applied and as compactly nested will optimally contain a drive chain which is applied to the sprocket portion 29 in the event whipping should occur in use thereof.

Accordingly, the nature of the chain guard and sprocket structure of the invention is such to produce a flush overall contact between the central portions and an interrelation thereof providing a mutual reinforcement and rigidifying of their parts. As interfit the chain guard and sprocket plate may then be applied as an assembly to a pedal structure of a bicycle without the need for special fasteners.

As seen in FIG. 1, which shows only so much of a bicycle as may be necessary to illustrate the application of the structure of the invention, a bicycle frame 64 embodies a tubular bearing housing 66 the opening through which is oriented in a position transverse to the plane of the bicycle frame. The housing 66 conventionally accommodates the horizontal portion of a pedal crank shaft 68 the respective ends of which form arms 70 and 72 which are bent to project at right angles from the horizontal portion 68 and in diametrally opposite directions. The projected end portions of the arms 70 and 72 are bent to project horizontally and mount pedal assemblies in a conventional manner (not shown). As illustrated the horizontal crank shaft portion 68 is threadedly engaged by nuts 76 which function to serve to contain the inner race of the bearing assemblies 69 which bridge the respective ends of the housing 66. It will be seen from the drawings that the outer races of the bearing assemblies limit against the outer ends of the bearing housing 66. With reference to the orientation shown in FIG. 1, a washer 78 positions immediately to the left of the bearing housing to have one face abut the outermost face of a nut 76 and its outer face position substantially to surround a collar formation 80 on the crank shaft portion 68. Prior to the crank shaft assembly being applied and thrust through the housing 66 to dispose the crank shaft portion 68 therein, the assembly of the sprocket structure and the guard plate previously described is applied over the crank shaft portions 72 and 68 to accommodate in the apertures 28 and 42 thereof the collar formation 80, to which the invention assembly is mounted with a slip or press fit. In the mount of the assembly, its position is limited by a flange 81 provided on the outermost end portion of the collar 80. Thus, in the mounting of the invention assembly it is contained at its outermost face by the abutting engagement of the flange 81 with the disc surfaces of the guard plate about its aperture 42. By the same token, when there is a total assembly of the invention structure to the crank shaft, the washer 78 is in abutted containing relation to the rear face of the disc portion 10 of the sprocket structure, held firmly thereto by reactant pressure applied by the adjacent nut 76. A nut applied at the opposite end of housing 66 cooperates with flange 81 in holding the parts in an assembled relation. Simultaneously with the mount of the invention assembly to the collar formation 80, the laterally directed driving stud 82 integral with the pedal crank shaft arm 70 will thrust through a pair of the aligned apertures 30 and 44. As may be seen, no special circular positioning of the invention assembly is necessary due to the arrangement of the plurality of paired apertures 30 and 44 offering a selection thereof for accommodating the driving stud 82.

As may be seen, therefore, the mount of the sprocket structure, with or without the guard plate of the invention may be simply and easily effected. The sprocket structure so provided will insure a rugged and precisely determined positioning of the respective sprocket portions. Moreover, the assembly does not require any special connectors. Of course, optimal usage is defined when the guard plate of the invention is used in combination with the sprocket structure of the invention in view of their particularly configured plate form.

No further detail of a bicycle structure has been shown or described since the nature and character of the invention should be clearly obvious to one versed in the art by virtue of the details of the present disclosure.

It will be obvious, of course, that while the embodiment of the invention illustrated is shown with a preferred number and disposition of sprocket teeth to suit a particular application, other arrangements may be utilized which embody basically novel features of the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statue the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A compound sprocket structure particularly advantageous for use in a bicycle or other vehicle comprising a single plate structure including at least two plate segments each of which has a peripheral edge formed to include a set of teeth, one of said plate segments being offset from the other to provide that said plate segments are arranged thereby to lie in adjacent substantially parallel planes, one of said plate segments being rimmed by and lying within the boundary of the other and the outer of said plate segments having an annular shape, and strip-like plate portions providing connector means joining the respective plate segments, as a continuing part thereof, to rigidly maintain said plate segments in their respective offset substantially parallel planes.

2. A compound sprocket structure particularly advantageous for use in a bicycle or other vehicle comprising at least two plate segments each of which has a peripheral edge formed to include a set of teeth, one of said plate segments being offset from the other to provide that said plate segments are arranged thereby to lie in adjacent substantially parallel planes, one of said plate segments being rimmed by and lying within the boundary of the other and the outer of said plate segments having an annular shape, and connector means joining said plate segments and forming a continuation of the plate form thereof, said structure having the appearance of a plate having a dished configuration, the central portion and base of said dish being provided by said one plate segment, which has a disc-like shape.

3. A sprocket structure as in claim 2 characterized by the outer peripheral edge of said disc-like portion of said plate embodying therein a series of circularly spaced notches, at the base of at least a portion of which notches said disc-like portion of said plate has joined thereto and extended radially outward therefrom strip portions of said plate which are offset and connected at their radial outermost ends in an integrated relation to the inner edge of the outer one said plate segments to provide said connector means and maintain said outer one of said plate segments in a rigidly connected, concentric and relatively fixed relation to said disc-like portion of said plate.

4. A spocket structure particularly advantageous for use in a bicycle or other vehicle comprising a plate formed to include therein a plurality of concentric plate portions which are relatively displaced to occupy offset substantially parallel planes, said plate having a dished configuration, the base of said dish being formed by a central portion thereof which has a disc-like shape, said central dished portion being relatively flat and the peripheral edge thereof being formed to include thereon a set of circularly spaced outwardly projected sprocket teeth, the outer peripheral edge of said disc-like portion of said plate embodying therein a series of circularly spaced notches, at the base of at least a portion of which notches said disc-like portion of said plate has joined thereto and extended radially outward therefrom strip-like portions of said plate which are offset and connected at their radial outermost ends in an integrated relation to an outer one of said concentric plate portions to maintain said outer one of said concentric plate portions in a rigidly connected and respectively fixed relation to said disc-like portion of said plate and said disc-like portion of said plate including, in integral connection therewith, means for mounting a guard to said sprocket structure without need for conventional fasteners.

5. A sprocket structure as in claim 4 characterized by said mounting means being provided by means defining arcuate slots in said disc-like portion of said plate.

6. A sprocket structure as in claim 5 characterized by said disc-like portion of said plate having embodied therein a plurality of apertures which may be selectively utilized to mount the sprocket structure to a driving stud.

7. A sprocket and chain guard assembly including a single element having the form of a plate formed to include therein a plurality of concentric plate portions which are relatively displaced to occupy offset substantially parallel planes, one of said concentric plate portions forming a central part of said plate element and being dished inwardly of the outer peripheral portion of said plate element which forms another of said concentric plate portions, said relatively dished central portion being peripherally toothed and forming a substantially flat sprocket surrounded and recessed relative to an outwardly positioned annular portion of said plate element which is peripherally toothed and defines a sprocket of larger diameter, and a dish shaped plate forming a chain guard mounting in a nesting relation to said plate element and seating to said central flat sprocket portion thereof and means embodied in said central flat sprocket and said chain guard for a releasable interconnection thereof by a rotation of one relative the other.

8. Apparatus as in claim 7 characterized by one of said central plate portion and said chain guard having therein a plurality of arcuate slots outlining tabs therein and the other thereof having portions to receive said tabs and interlock therewith on rotary motion of one of said plates relative the other.

9. Apparatus as in claim 8 characterized by said flat central plate portion and said chain guard having stud accommodating apertures brought into registry by a rotary motion of one of said plates relative the other to effect said interlock therebetween.

10. A chain guard for use in conjuction with a sprocket structure comprising a plate a central portion of which is relatively recessed with respect to its outer peripheral portion, said central portion embodying means therein to interfit with related sprocket structure by a rotary movement of one relative the other.

11. A chain guard as in claim 10 characterized by said central plate portion including circularly spaced portions which are offset from the plane thereof and partly cut away to define pockets opening at one face of said central plate portion, adapting said chain guard for an interfit with complementary mounting means in connection with a related sprocket structure by a rotation of one relative the other.

12. A chain guard according to claim 11 wherein said central plate portion of said chain guard embodies a series of circularly spaced apertures which may be selectively utilized to mount the chain guard on a driving stud.

13. A sprocket structure and chain guard assembly including the chain guard of claim 11 characterized by said sprocket structure being comprised of integrally connected relatively offset sprockets of different diameter, the sprocket of smaller diameter being formed for flush seating thereof to said central portion of said chain guard and having therein arcuate crescent-shaped apertures, said crescent-shaped apertures forming tongue-like portions in said sprocket structure adapted to enter said pockets formed in said central plate portion of said chain guard in response to an appropriate alignment of said plates and a rotary motion of one relative the other.

14. A sprocket structure comprising a single plate formed as a stamping from sheet material wherein a central portion thereof is dished relative to an outer peripheral portion and each said portion is formed to include a set of circularly spaced outwardly projected sprocket teeth and portions of said plate intermediate said central portion and said outer peripheral portion being formed as a web to maintain said central portion and said outer peripheral portion in substantially parallel planes.

15. Apparatus as set forth in claim 14 characterized in that said central portion of said plate includes, in integral connection therewith, means for mounting a guard to said sprocket structure without need for conventional fasteners.

16. A sprocket structure as in claim 14 characterized in that said outer peripheral portion of said plate has an annular configuration and embodies the teeth in connection therewith on its outer periphery and said central portion of said plate is a plate segment of disc-like shape incorporating the teeth in connection therewith in a manner that they project from its outer periphery in a circularly spaced relation and said web which interconnects said central and said outer peripheral portions of said plate is comprised of a plurality of relatively narrow bands of sheet material from which said plate is formed, said bands being smoothly bent to provide for the offset of one of said central and outer peripheral plate portions from the other.

17. A sprocket structure as in claim 16 characterized in that said narrow bands forming said web are radially oriented and circularly spaced about the periphery of said central portion of said plate and intermediate the successively adjacent of said bands said central portion of said plate embodies, in each case, a plurality of projected sprocket teeth.

* * * * *

UNITED STATES PATENT AND TRADEMARK OFFICE
CERTIFICATE OF CORRECTION

PATENT NO. : 4,044,621
DATED : August 30, 1977
INVENTOR(S) : John C. McGregor, Sr.; Daniel P. McGregor; James B. McGregor It is certified that error appears in the above-identified patent and that said Letters Patent are hereby corrected as shown below:

Col. 1, line 6, "metods" is corrected to read -- methods --.

line 25, after "be" insert -- a --.

Col. 2, line 4, "utilized" is corrected to read -- unitized --.

Col. 3, line 26, delete "or" (first occurrence).

Col. 3, line 46, "integrating" is corrected to read -- interengaging --.

Col. 4, line 31, "interruption" is corrected to read -- interruptions --.

Col. 4, line 38, "equivalent" is corrected to read -- "equivalently --.

Col. 4, line 67, "aperture" is corrected to read -- apertures --.

Col. 5, line 3, "utilized" is corrected to read -- unitized --.

Col. 5, line 23, "offet" is corrected to read -- offset --.

UNITED STATES PATENT AND TRADEMARK OFFICE
CERTIFICATE OF CORRECTION

PATENT NO. : 4,044,621

DATED : August 30, 1977

INVENTOR(S) : John C. McGregor, Sr.; Daniel P. McGregor; James B. McGregor

It is certified that error appears in the above-identified patent and that said Letters Patent are hereby corrected as shown below:

Col. 5, line 64, "case" is corrected to read -- base --.

Col. 7, line 23, "surfaces" is corrected to read -- surface --.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*

Notice of Adverse Decision in Interference

In Interference No. 99,973, involving Patent No. 4,044,621, J. C. McGregor, D. P. McGregor and J. B. McGregor, SPROCKET STRUCTURE AND CHAIN GUARD, final judgment adverse to the patentees was rendered Feb. 20, 1981, as to claims 1-4 and 14-17.

[*Official Gazette March 7, 1989.*]